United States Patent [19]

Presset et al.

[11] 4,090,151
[45] May 16, 1978

[54] TEMPERATURE SENSING DEVICE FOR PRODUCING ALTERNATING ELECTRIC SIGNALS WHOSE PERIOD IS A FUNCTION OF A TEMPERATURE

[75] Inventors: René Presset; Michel Torregrosa, both of Portes les Valence, France

[73] Assignee: Crouzet, Paris, France

[21] Appl. No.: 760,577

[22] Filed: Jan. 19, 1977

[30] Foreign Application Priority Data

Jan. 28, 1976 France ............................. 76 02508

[51] Int. Cl.² ............................................ G01K 7/22
[52] U.S. Cl. .................................. 331/66; 73/362 SC
[58] Field of Search ................. 73/341, 342, 362 SC, 73/362 AR, 362 R; 331/66; 307/310

[56] References Cited

U.S. PATENT DOCUMENTS

| | | | |
|---|---|---|---|
| 3,440,883 | 4/1969 | Lightner | 73/362 SC |
| 3,604,957 | 9/1971 | Satula | 73/362 SC |

*Primary Examiner*—John Kominski
*Attorney, Agent, or Firm*—Holman & Stern

[57] ABSTRACT

A device for producing at the output of a multivibrator an electric signal the period of which is a linear function of a temperature to which is subjected the measuring probe, characterized in that said multivibrator consists in a comparator whose first input comprises the probe, said probe consists in at least two semi-conducting junctions connected two by two in parallel and in opposite directions, and the other components of the device, particularly those of the second comparator input comprising a capacitor, remains invariable.

3 Claims, 5 Drawing Figures

TEMPERATURE SENSING DEVICE FOR PRODUCING ALTERNATING ELECTRIC SIGNALS WHOSE PERIOD IS A FUNCTION OF A TEMPERATURE

BACKGROUND OF THE INVENTION

The present invention relates to a temperature-sensing device for measuring the temperature of a medium, or the difference in temperature between two media, producing at the output of the device and electric signal indicative of the temperature.

In devices of such type which are already known, the electric signals are analog, and an analog-to-numerical conversion has to be made in order to facilitate the processing of numerical data.

Furthermore, in order to reach a good measuring accuracy, high price metallic probes are used.

SUMMARY OF THE INVENTION

The device according to the invention provides the possibility of avoiding such disadvantages, by producing at the output of a multivibrator an electrical signal the period of which is a linear function of a temperature to which the measuring probe is subjected. The multivibrator includes a comparator whose first input comprises the probe, with at least two semi-conducting junctions connected two by two in parallel and in opposite directions. The second comparator input comprising a capacitor which remains constant.

The device according to the invention produces directly the data in numerical form in relation to a temperature or a difference in temperature from the semi-conducting junctions currently available in the trade thus lowering the cast of this device.

A rectangular signal is obtained at the comparator output as well as a similar signal at the comparator input connected to the purely resistive components. A signal of exponential form appears at the comparator input connected to a capacitor. The period of the output signal is a function of these components, and the purpose of the invention is to use one or more of these components as thermal probes.

BRIEF DESCRIPTION OF THE DRAWINGS

The invention will become more apparent in conjunction with the accompanying drawing illustrating how the device according to the invention operates, wherein.

DETAILED DESCRIPTION OF A PREFERRED EMBODIMENT

Figure 1:
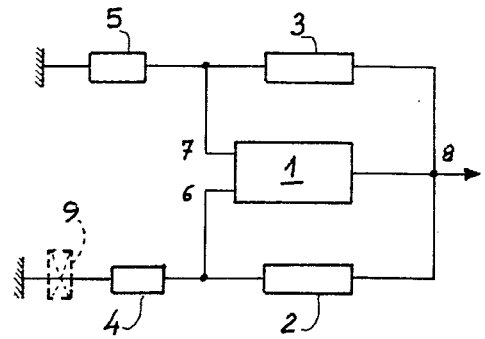
FIG. 1 is a block diagram of the present invention.
Figure 2:
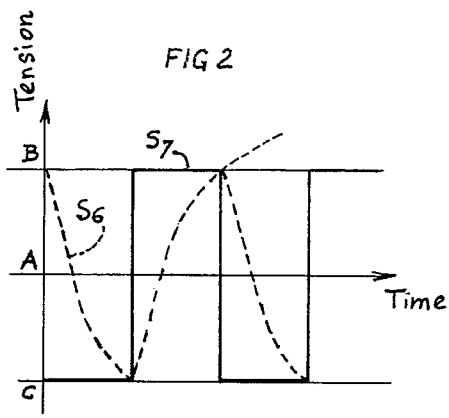
FIG. 2 is illustrative of the waveform of inputs to the comparator of FIG. 1.

In the construction, known per se, of a multivibrator such as that shown in FIG. 1, components 2, 3 and 5 are pure resistors and 4 a capacitor connected to an amplifier comparator 1. The alternating electric signal produced at the output 8 of the amplifier-comparator 1 is in form of a square wave signal, the period of which is a function of the signals received at inputs 7 and 6 of comparator 1. FIG. 2 shows these two input signals which are respectively rectangular at input 7 ($S_7$) and exponential at input 6 ($S_6$) because of resistor 2 and capacitor 4.

As the components have fixed values, the voltage at the terminals of resistor 5 assumes values AB or AC. If resistor 5 is replaced by a component such that the voltages at its terminals be AB and AC, depending on the sign of the voltage at output 8, the operation of the multivibrator is not changed. If the other components have fixed values, the period of the output signal is then function of sum AB + AC. The result is that if component 5 is a temperature sensing element, the period of the output signal is therefore also a function of the temperature and a numerical thermometer is thereby realized.

Component 5 may be either:
a thermistor, whose response to temperature is very quick but which has a nonlinear resistance characteristic,
a resistive probe (in copper, nickel, platinum...), and whose response is weaker but nearly linear,
an association of two semiconductor junctions connected in parallel and poled in opposition to each other.

The latter solution offers the advantage of using components currently available and of low cost, such as diodes and transistors. The direct voltage at the terminals of a semiconductor junction through which flows a specific current and subjected to a temperature $\theta$, expressed as follows:

$$U = U_o - k\theta$$

($U_o$ and $k$ being positive cnstants).

This voltage is stable and the variation law has a very good linearity over a broad temperature range.

Figure 3:
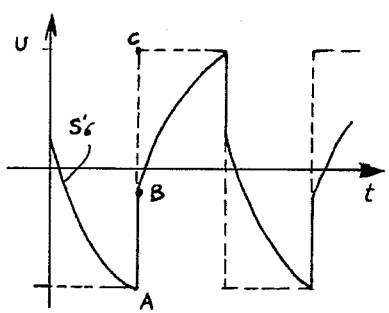
FIG. 3 is illustrative of the waveform of an embodiment of the present invention.
Figure 4:
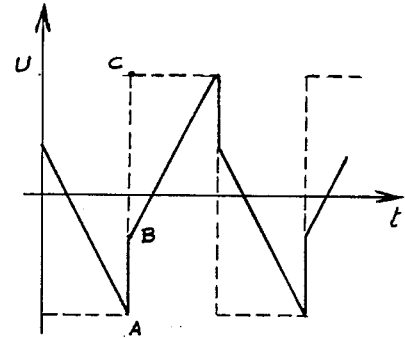
FIG. 4 is illustrative of the waveform of a further embodiment of the present invention.
Figure 5:
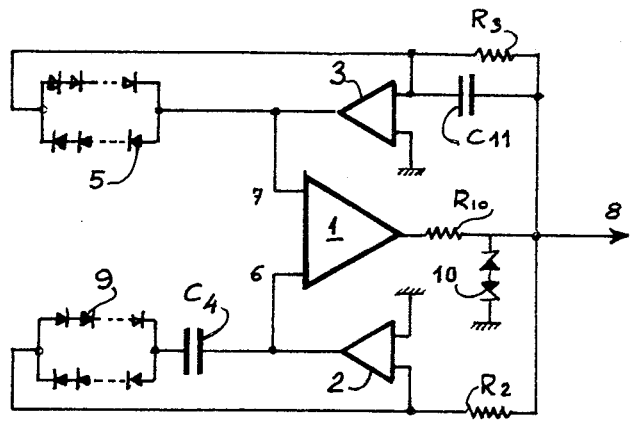
FIG. 5 is a circuit diagram of an embodiment of the present invention.

The circuit aforedescribed may also be used for converting into a numerical-electrical signal not a temperature as before but a differential temperature. For so doing, the components being identical with those of FIG. 1, a component 9 is connected in series with capacitor 4. Component 9 is either a resistive element or a semiconductor junction similar to aforementioned component 5. In such a case, signals $S'_6$ at input 6 have the form shown in FIG. 3. There is a sudden jump of voltage AB, making the output signal a function of the difference BC. If AC is a function of the temperature $\theta_1$ of a first medium and AB a function of the temperature $\theta_2$ of a second medium, the period of the output signal is then a function of the difference in temperature between both media. As a matter of fact, signal $S'_6$ is not linear as shown in FIG. 4 and in practice the device of FIG. 1 is realized according to the circuit of FIG. 5.

The amplifier-comparator 1 is connected to a voltage regulator comprising a resistor $R_{10}$ and two Zener diodes 10 connected in series and poled in opposition, since the signals are positive or negative. Instead of resistors 2 and 3 of FIG. 1, which might be pure resistors, two current generators 3,$R_3$ and 2,$R_2$ are used whose function is to provide a constant current to components 5 and 9 which are sensitive to the temperature and to capacitor $C_4$ of capacitance C. If Io is the absolute value of said current, and if components 5 and 9 are resistive probes with values $R_1$ and $R_2$, the period of the signal is equal to If the resistance characteristics of the probes in response to temperature $\theta$ is expressed by:

$$R = Ro (1 + \alpha \theta)$$

and if $R_1$ is subjected to temperature $\theta_1$ and $R_2$ to $\theta_2$, the period T is expressed by $$T = 4 \, C \, Ro \, \alpha \, (\theta_1 - \theta_2)$$

On the other hand, if components 5 and 9 are semiconductor junctions with the following law $U = Uo - K$, the period of the output alternating signal is equal to $$T = 4 \, C \, (1/Io) \, k \, (\theta_2 - \theta_1)$$

In order to improve the performance of the device according to the invention, a capacitor $C_{11}$ provides the possibility of increasing the switch speed and thus decreasing the lower limit of the period of the alternating output signal.

Finally, in order to reduce the difference in characteristic between both probes 5 and 9 realized by means of two semiconductor junctions, and taking in account their low cost, said junctions may be connected in parallel two by two.

The association of twice n junctions provides in fact the possibility of multiplying the sensitivity of the probe by n, and therefore of reducing accordingly the errors due to the circuit, while multiplying the various errors of the junctions by $\sqrt{n}$ only.

By way of an example, if the characteristics of the components of circuit 5 are the following:

1 — Amplifier μA 709
3 and 2 — Amplifier μA 741
5 and 6 — diodes 144146
$C_4$ — 4.7 μF
$R_2$ — 10 kΩ
$R_3$ — 10 kΩ
$R_{10}$ 13 1.1 kΩ
$C_{11}$ — 39 pF
10 — 5.6 v, it is possible to measure with the temperature sensing device differences $(\theta_1 - \theta_2)$ within the range:

$$0.1° \, C < \theta_1 - \theta_2 < 100° \, C$$

for $$0 < \theta_1 < 120° \, C$$

and $$0 < \theta_2 < 120° \, C$$

and the period of the output signal of the device is expressed by:

$$T_{\mu s} \simeq 250 \times (\theta_1 - \theta_2)° \, C$$

The device according to the invention may be used in a numerical display line for measuring temperatures or temperature differential. A particularly interesting application may be the detection of temperature differences between the inlet and the outlet of a water central heating installation, in order to introduce said data into a thermal counter making numerical calculations.

What we claim is:

1. A temperature sensing device for producing an alternating electric signal the period of which is linear function of the temperature being measured, said device comprising:
   a first sensing probe comprising at least two semiconductor junctions connected in parallel and poled in opposition to each other; and
   a multivibrator comprising an amplifier-comparator having first and second inputs and an output, said first input connected to said first sensing probe, a first resistor connected between said first sensing probe and said output, a first capacitor and a second resistor, said first capacitor and said second resistor connected in series between said second input and said output.

2. The device of claim 1, wherein said temperature being measured is a temperature differential and said device includes a second sensing probe connected in series with said first capacitor.

3. The device of claim 2, wherein said device further includes a voltage regulator connected to said output, a second capacitor, and first and second current generators, said voltage regulator comprising a third resistor and two Zener diodes connected in series and poled in opposition to each other, said first current generator for supplying said first probe with a constant current, said first current generator including said first resistor, said second current generator connected to said second input for supplying said second probe with a constant current, said second capacitor for decreasing a lower limit of said period at said output.

* * * * *